United States Patent
Spampinato et al.

(10) Patent No.: US 7,305,148 B2
(45) Date of Patent: Dec. 4, 2007

(54) COLOR INTERPOLATION USING DATA DEPENDENT TRIANGULATION

(75) Inventors: Giuseppe Spampinato, Catania (IT); Giuseppe Messina, Giardini Naxos (IT); Arcangelo Ranieri Bruna, San Cataldo (IT); Mirko Guarnera, Gela (IT)

(73) Assignee: STMicroelectronics S.r.l., Argate Brianza (IT)

( * ) Notice: Subject to any disclaimer, the term of this patent is extended or adjusted under 35 U.S.C. 154(b) by 317 days.

(21) Appl. No.: 11/190,571

(22) Filed: Jul. 27, 2005

(65) Prior Publication Data
US 2006/0022997 A1 Feb. 2, 2006

(30) Foreign Application Priority Data
Jul. 30, 2004 (EP) .................................. 04425587

(51) Int. Cl.
*G06K 9/32* (2006.01)
(52) U.S. Cl. ..................................... 382/299
(58) Field of Classification Search ........ 382/298–300, 382/162–167, 274–275, 199, 154, 254, 260–266; 348/272–273, 606–607; 358/1.9, 3.23, 3.27, 358/525, 532; 345/581–582, 589–611
See application file for complete search history.

(56) References Cited

U.S. PATENT DOCUMENTS 5,704,025 A * 12/1997 Berry .......................... 345/589
5,933,547 A * 8/1999 Dudon et al. ................ 382/300
6,016,151 A * 1/2000 Lin ............................. 345/582
6,229,578 B1 * 5/2001 Acharya et al. ............. 348/607
7,015,930 B2 * 3/2006 Gruber ........................ 345/606
7,215,810 B2 * 5/2007 Kaufmann et al. .......... 382/154

OTHER PUBLICATIONS

"Demosaicing of Colour Images Using Pixel Level Data-Dependent Triangulation", Su et al., Proceedings Theory and Practice of Computer Graphics IEEE Comput. Soc Los Alamitos, CA, USA, Jun. 5, 2003, pp. 16-23, XP002302392, ISBN: 0-7696-1942-3.

"SVG Rendering of Real Images Using Data Dependent Triangulation", Battiano et al, XP-002302939, 4 pages, available at http://www.dmi.unict.it/{battiato/download/SCCG04.pdf.

"Image Reconstruction Using Data-Dependent Triangulation", Yu et al, IEEE Computer Graphics and Applications IEEE USA, vol. 21, No. 3, Jun. 30, 2001, pp. 62-68, XP002302394, ISSN: 0272-1716.

"Demosaicking Methods for Bayer Color Arrays", Ramanath et al., Journal of electronic Imaging, SPIE+IS&T, US, vol. 11, No. 3, Jul. 2002, pp. 306-315, XP001122626, ISSN:1017-9909.

* cited by examiner

*Primary Examiner*—Ishrat Sherali
(74) *Attorney, Agent, or Firm*—USA K. Jorgenson

(57) ABSTRACT

A fast method of color interpolation of pixels of an image acquired by a color filtered digital sensor uses a very simple cost function that nevertheless produce interpolated images of good quality. The cost function is computationally simpler because it does not require the calculation of powers and square roots. The triangulation algorithm may be executed in far less time, while practically ensuring the same performance. The triangulation algorithm on average may use only two iteration steps. The interpolation process may be followed by an anti-aliasing processing that effectively removes color artifacts.

18 Claims, 10 Drawing Sheets

Data Dependent Triangulation

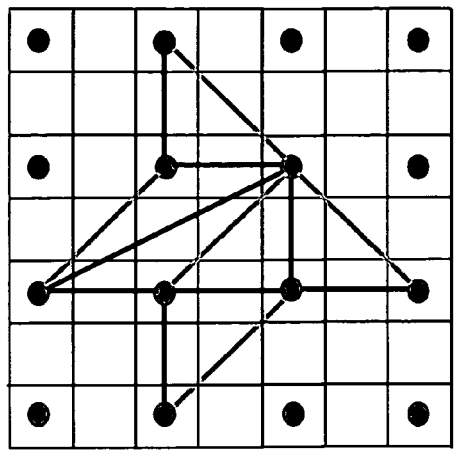
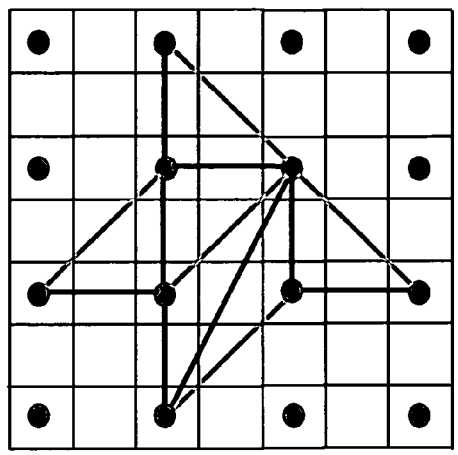
FIG. 14A                FIG. 14B
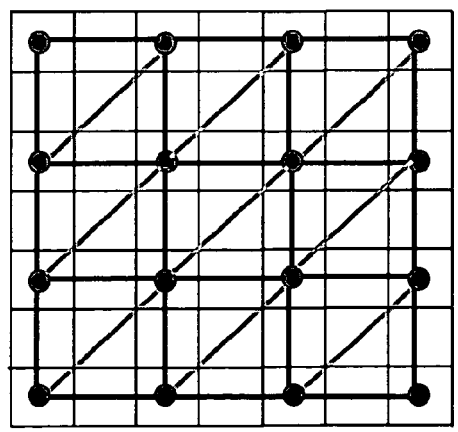
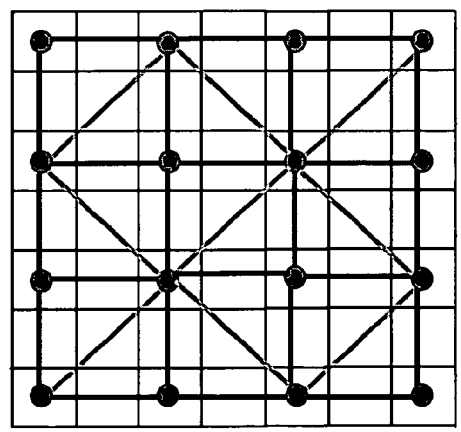
FIG. 15A                FIG. 15B $$\hat{G} = G; \quad \hat{R} = G - v_{GR}; \quad \hat{B} = G - v_{GB};$$
$$\hat{R} = R; \quad \hat{G} = R + v_{GR}; \quad \hat{B} = R - v_{RB};$$
$$\hat{B} = B; \quad \hat{G} = B + v_{GB}; \quad \hat{R} = B + v_{RB};$$

$$\hat{G} = G; \quad \hat{R} = G - v_{GR}; \quad \hat{B} = G - v_{GB};$$
$$\hat{R} = R; \quad \hat{G} = R + v_{GR}; \quad \hat{B} = \hat{G} - v_{GB};$$
$$\hat{B} = B; \quad \hat{G} = B + v_{GB}; \quad \hat{R} = \hat{G} - v_{GR};$$

FIG. 18

COLOR INTERPOLATION USING DATA DEPENDENT TRIANGULATION

FIELD OF THE INVENTION

The invention relates in general to processing techniques of image data acquired by a color digital sensor, and, more in particular, to a method of interpolating the color information for each image pixel.

BACKGROUND OF THE INVENTION

Modern digital cameras use an electronic sensor for acquiring the spatial variations of light intensity. The two main fabrication technologies of sensors are the so called CCD (Charge Coupled Device) and the CMOS (Complementary Metal Oxide Semiconductor).

For example, a CCD is provided by an array of photosensitive diodes that converts photons into electrons (electric charge). Each diode, called a photodiode produces an electric charge proportional to the quantity of light reaching it.

The single sensors of a digital camera are normally arranged as a two-dimensional array of millions of cells (photodiodes), which convert an infinitesimal portion of the image into electric charge. The stored generated charge is then transformed into a pixel of digital image by an analog-to-digital converter.

A monochromatic sensor is made sensitive to a single color component by a color filter. A filter may act on primary colors or on complementary colors. The primary color filters are commonly arranged according to a scheme known in the art by the name of Bayer pattern in which half of the pixels are made sensitive to the green color, a fourth of the pixels to the red color and the last fourth to the blue color. As depicted in FIG. 1, green and blue pixels alternate along a row, while green and red pixels alternate on the successive row and this scheme repeats itself for the whole image.

The main reason the number of acquired green pixels are doubled compared to the number of acquired red and blue pixels is the greater sensitivity of human vision of the green chromatic component. Therefore, the value of each pixel of a CCD sensor carries information on a single primary color.

To reconstruct a good quality color image it is therefore desired to carry out an operation known as color interpolation for generating a triplet of values RGB for each pixel of the image to be produced at an output. Therefore, for example, for estimating the red component of a pixel for which only the green component has been acquired by the filtered light sensitive cell, it is necessary to take into consideration the adjacent pixels carrying information on the red component.

Bicubic and bilinear color interpolation are simple and efficient algorithms, but they may introduce large errors in the contour zones of the images. To address this problem several authors have proposed optimization algorithms that are sensitive to the input data. For example, Adams introduced an edge oriented method, and Kimmel, Adams, and Pei-Tam suggested other color correlation methods.

Triangulation is another well-known technique of linear interpolation that has been proposed for performing zooming on a digital image. A brief review of triangulation-based linear interpolation approaches is presented herein below.

Triangulation: Basic Considerations

Basically, the approach is to partition an image into triangles, the vertices of which are the known pixels, according to certain criteria. The color rendering or reconstruction phase follows during which each pixel value of the image to be produced is calculated through a linear interpolation of the vertices of the pertinent triangle.

Given a set of distinct points $V=\{(x_i, y_i)\}$, what is of interest is a convex hull triangulation of V, that is a set $T=\{T_j\}_{i=1 \ldots q}$ of non degenerate triangles that satisfies the following conditions:

every triangle vertex is an element of V, and every element of V is a triangle vertex;

every edge of a triangle in T contains exactly two points from V;

the intersection of any two different triangles in T is either empty, or is a shared edge or a shared vertex; and the union of all triangles in T is the convex hull of V.

The criteria for choosing one among all the possible triangulations is to minimize a certain cost function C(T) of the entire triangulation T. Dyn-Levin-Rippa [5] suggested, among others, the following overall function cost:

$$C(T)=\Sigma|\text{cost}(e)| \quad (1)$$

for each edge e of T with a chosen cost(e). Once a possible triangulation is chosen, the values of the pixels will be interpolated by the unique 3D linear polynomial passing for the three vertices of the triangles. The 3D liner polynomial will be:

$$P_i(x,y)=a_i x+b_i y+c_i \quad (2)$$

for each triangle $T_i$ of T.

Delaunay Triangulation

According to the Delaunay triangulation each triangle is such that the circle passing for his three vertices does not contain any other vertex of V, where $V=\{v_i\}$ set of distinct vertices. The construction of a Delaunay triangulation is defined through its Voronoi diagram.

The Voronoi diagram for V is the partition Vor(V) of the plane into the Voronoi polygons associated to V. The Voronoi polygon associated to $v_i$ is the locus of points in the plane that are closer to $v_i$ than to any other member of V.

The Delaunay triangulation can be defined as follow:

partitioning of the set V in two subsets $V_1$ and $V_2$ of the same dimension;

recursively constructing Vor($V_1$) and Vor($V_2$); and merging of Vor($V_1$) and Vor($V_2$) to obtain Vor(V).

FIGS. 2 and 3 show the duality of the two problems.

If the vertices of V are equally spaced (as it would be in the case of color interpolation), the resulting triangles will be equilateral triangles. Dyn-Levin-Rippa [9] demonstrated that triangulations involving long, narrow triangles give better results in linear interpolation.

Data Dependent Triangulation

Several optimization algorithms for performing what may be defined as Data Dependent Triangulation have been developed. For example, Lawson's algorithm [10] converges to the globally optimal solution if the cost function is based on the Delaunay criterion. Schumaker's simulated annealing method [11], gives good results, but is relatively slow. The "edge swap with look-ahead" method [8], is relatively faster than other algorithms.

The Yu-Morse-Sederberg's "edge swap with look-ahead" method includes the following steps:

a) the phase of triangle construction (step 0) is basically a Delaunay Triangulation, conducted in a very simple way: all the vertices are joined to form quadrilaterals (for vertices equally spaced they would be squares) and the diagonal (edge) having the lower cost according to the particular cost function chosen in the quadrilateral will determine the initial triangulation, as depicted in FIG. 4. FIG. 5 illustrates a single diagonal swapping inside a considered quadrilateral; and
b) an iterative phase (step 1 . . . n) during which each quadrilateral and its four adjacent triangles are considered, trying all the possible single swapping of the diagonals to minimize the local cost (that is the cost of all the 13 edges involved). The routine ends when all quadrilaterals have been processed. FIG. 6 illustrates, at bottom, the possible 4 triangulations originated from a starting triangulation (depicted at the top of the figure) by a single edge swap.

The process is repeated n times, using the results of the previous iteration step.

Cost Functions

A number of cost functions for characterizing a satisfactory triangulation interpolation have been proposed.

In particular, Dyn-Levin-Rippa [5] identify four cost functions called NC1 (Nearly $C^1$), as particularly efficient. The cost for an edge $e=[(x_1,y_1), (x_2,y_2)]$ in common with two triangles $T_1$ and $T_2$, the interpolating planes of which are respectively $P_1(x,y)=a_1x+b_1y+c_1$ and $P_2(x,y)=a_2x+b_2y+c_2$, may be calculated according to a selected cost function:

a) ABN (Angle Between Normals) cost function disclosed in Choi, et al. [12]

$$\text{cost}(e)=\cos(\alpha) \qquad (3)$$

where $\alpha$ is the angle between the normals to the interpolating planes $P_1$ and $P_2$.

b) JND (Jump in Normal Derivatives) cost function $$\text{cost}(e)=|n_x(a_1-a_2)+n_y(b_1-b_2)| \qquad (4)$$

where $(n_x, n_y)$ is a unit vector orthogonal to the projection of the edge e.

c) DLP (Deviation from Linear Polynomials) cost function $$\text{cost}(e)=\|h\| \qquad (5)$$

where $$h = \begin{bmatrix} |P_1(x_2, y_2) - F_2| \\ |P_2(x_1, y_1) - F_1| \end{bmatrix};$$

$F_i$=value $(x_i, y_i)$ d) DP (Distance from Planes) cost function $$\text{cost}(e)=\|g\| \qquad (6)$$

where $$g = \begin{bmatrix} dist(P_1, w_2) \\ dist(P_2, w_1) \end{bmatrix};$$

$w_i=(x_i, y_i, F_i)$;

$$dist(P_j, w_t) = \frac{|P_j(x_t, y_t) - F_t|}{sqrt(a_j^2 + b_j^2 + 1)}$$

Another cost function has been proposed by Yu-Morse-Sederberg [8]:

$$\text{cost}(e)=\|\Box P_1\|*\|\Box P_2\|-\Box P_1 * \Box P_2 \qquad (7)$$

where $\|\Box P_i\|=\text{sqrt}(a_i^2+b_i^2)$ $P_i(x,y)=a_ix+b_iy+c_i$ $\Box P_i=(a_i, b_i)$ gradient of $P_i$

DISCUSSION OF THE PRIOR ART

A first approach to use pixel level data dependent triangulation [5] even for color interpolation, was proposed by Su-Wills [6], following a previous work [7]. This method of color interpolation matches the edge orientation of the images and correlates the three distinct pixel channels (RGB).

Su-Wills Algorithm

Su-Wills algorithm [6] is based on the Delaunay Triangulation. As depicted in FIG. 7, the construction of triangles is relatively simple. For R and B channels (or patterns), they are constructed as in the case of a zooming by 2. Differently, for the G patterns, they are constructed with a rotation by 45 degrees. In practice, due to the simplicity of triangulation, the triangles do not require an appreciable burden for their definition.

To determine which diagonal should be chosen, a simple cost function is used as indicated in FIG. 8. As usual, the cost function for the G pattern or channel will be the same, considering a rotation of the triangles by 45 degrees. The interpolated points of the triangles (the black dots in FIG. 8) are easily calculated as the average of the relative vertices. Practically, this known technique does not contemplate any iteration and though relatively simple to implement, does not produce a satisfactory color rendering in the interpolated images.

On the other hand, the use of more sophisticated triangulation algorithms as described above and of a cost function chosen among the above-mentioned four NC1 cost functions and the Yu-Morse-Sederberg [8] cost function for color interpolation would be excessively costly in terms of computation complexity, and in some cases, excessively slow.

It is generally perceived from these published works that it is not possible to have good interpolated images with a simple cost function and a fast triangulation algorithm, and that it is necessary to employ a sophisticated triangulation algorithm and a relatively complex cost function for obtaining satisfactory performance.

SUMMARY OF THE INVENTION

Contrary to these generally accepted conclusions, the present applicants have found simpler cost function and faster triangulation algorithms than those disclosed in Yu-Morse-Sederberg [8] that nevertheless produce interpolated images of comparably good quality. Surprisingly, applicants found that the quality of color interpolated images does not seem to degrade with respect to images obtained with the method disclosed in [8] when a computationally simpler cost function is used that does not require the calculation of powers and square roots.

Moreover, they found an efficient triangulation algorithm that may be executed in far less time than the triangulation algorithm disclosed in [8], while providing similar performance. The peculiarity of this triangulation algorithm may require on average only two iteration steps, while the triangulation algorithm disclosed in [8] may be completed only after four iteration steps.

Optionally, the interpolation process may be followed by anti-aliasing processing that effectively removes color artifacts that may be created during the interpolation process. According to an innovative aspect of this invention in the case of a Bayer pattern, this step is based on the use of only two difference arrays, namely green-blue and green-red, respectively, and the consequent calculation of only two median arrays therefrom. In addition, the invention may be easily implemented with a software computer program.

BRIEF DESCRIPTION OF THE DRAWINGS

FIGS. 14a and 14b illustrate possible edge swappings from the triangulation in FIG. 13;

FIGS. 15a and 15b illustrate two cases that may occur while performing a data dependent triangulation technique (DDT) according to the invention;

FIG. 18 summarizes the differences between the Freeman's algorithm (left) and the algorithm of this invention (right).

DETAILED DESCRIPTION OF THE PREFERRED EMBODIMENTS

The color interpolation method of this invention will be described by way of an example when considering the interpolation of a Bayer pattern image data as acquired by a digital color sensor. Naturally, the method is equally applicable to any other different scheme of acquisition using different filters, for example, for discriminating among complementary colors instead of primary colors.

Figure 1:
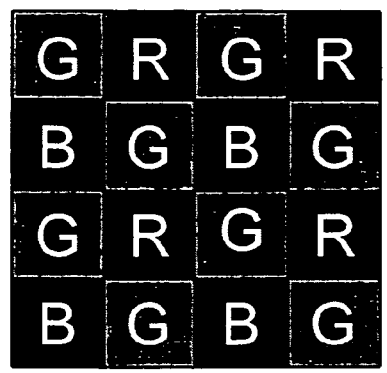
FIG. 1 shows a Bayer Pattern Array according to the prior art.
Figure 2:
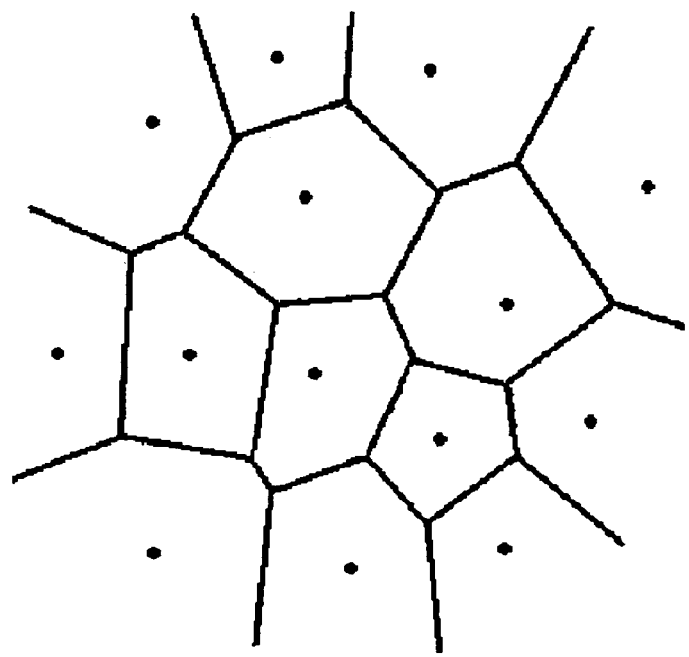
FIG. 2 depicts a sample Voronoi diagram according to the prior art.
Figure 3:
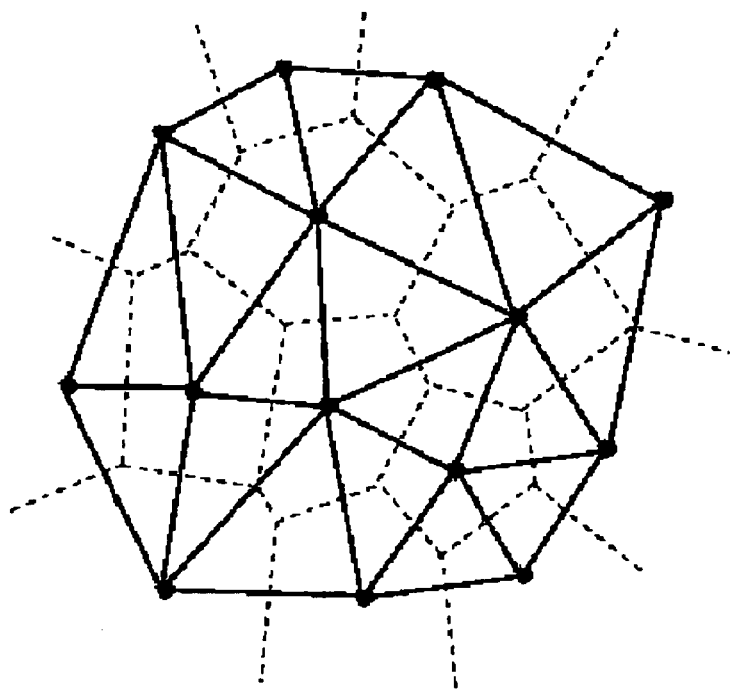
FIG. 3 illustrates how to obtain a Delaunay triangulation related to the Voronoi diagram according to the prior art.
Figure 4:
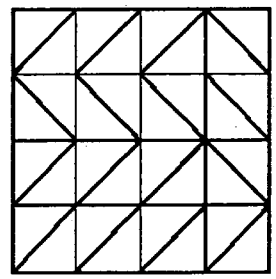
FIG. 4 illustrates a possible construction phase (step 0) for vertices equally spaced according to the prior art.
Figure 5:
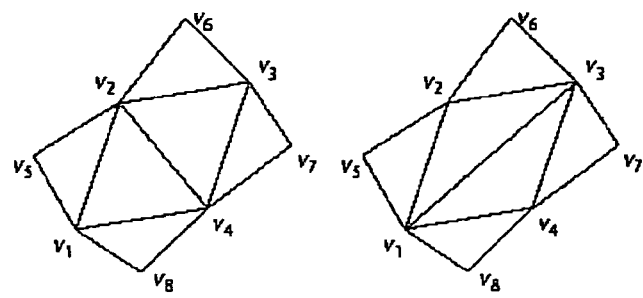
FIG. 5 shows a single diagonal swapping inside the considered quadrilateral according to the prior art.
Figure 6:
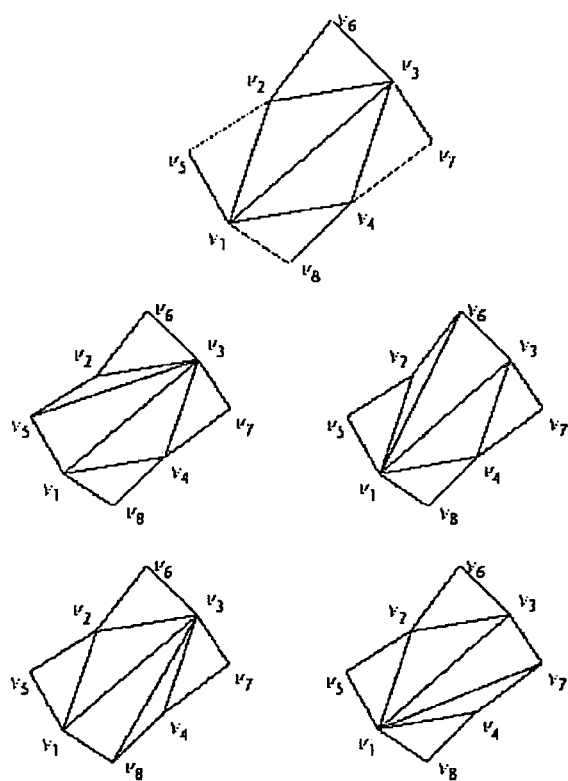
FIG. 6 shows all the possible 4 triangulation (bottom) originated from a starting triangulation (up) by doing a single edge swap according to the prior art.
Figure 7:
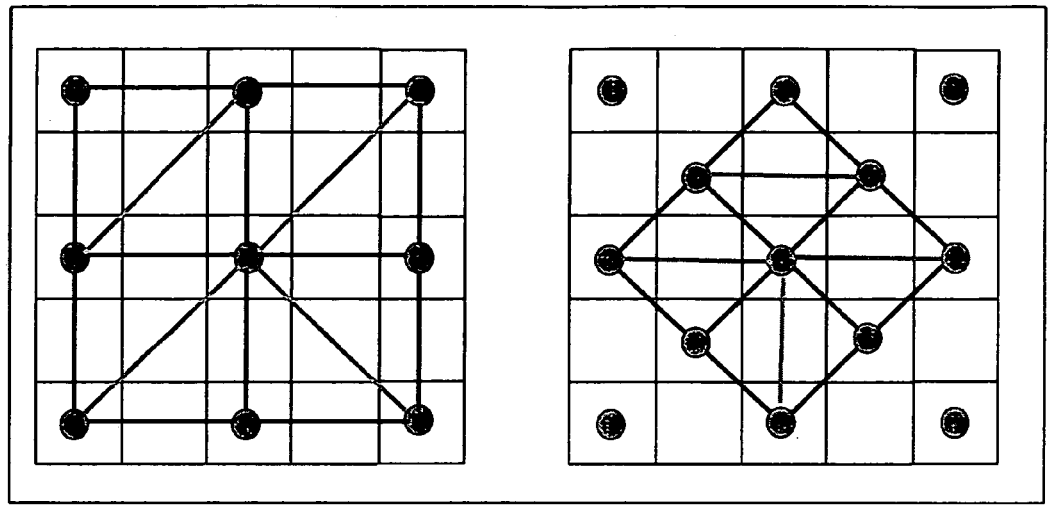
FIG. 7 illustrates the triangles "construction" in Su-Wills algorithm: Left: R or B case; Right: G case according to the prior art.
Figure 8:
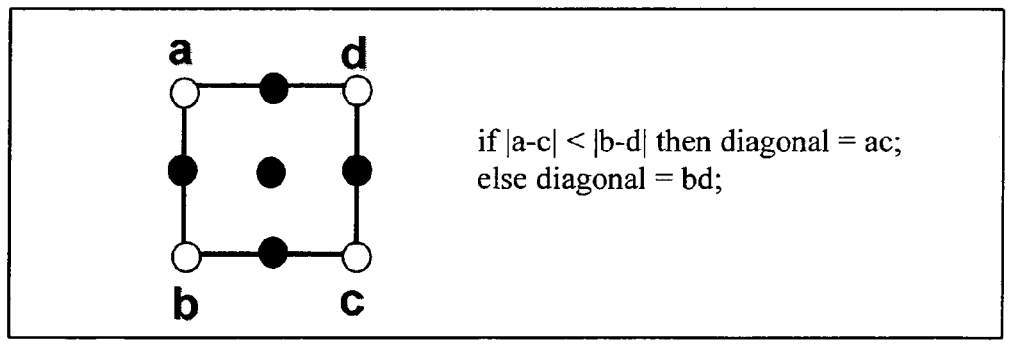
FIG. 8 basically illustrates the Su-Wills algorithm according to the prior art.
Figure 9:
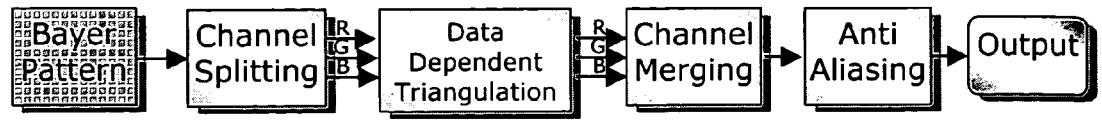
FIG. 9 depicts a color interpolation scheme of according to the invention.
Figure 10:
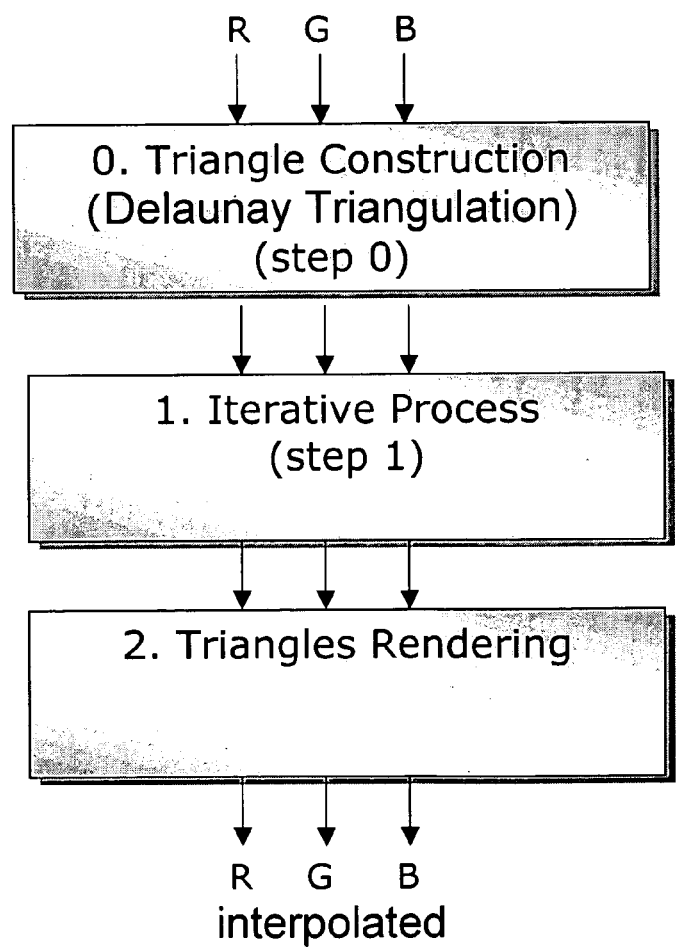
FIG. 10 illustrates the process steps performed in the block Data Dependent Triangulation of FIG. 9.
Figure 11:
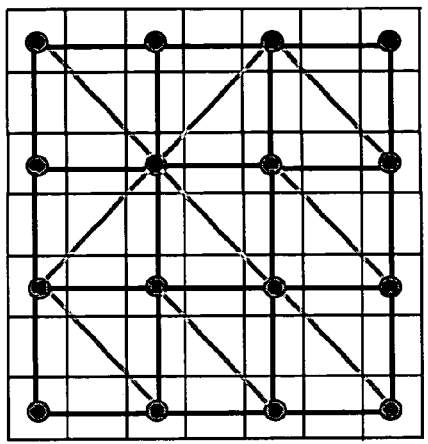
FIG. 11 illustrates an exemplary process in accordance with the invention.
Figure 11:
Figure 11:
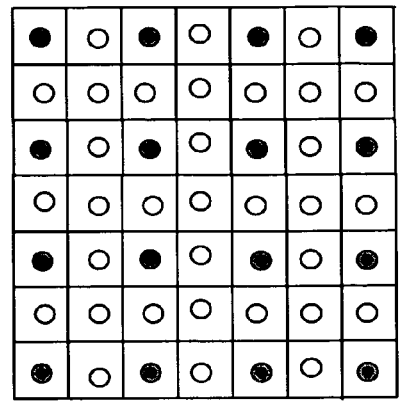
Figure 11:
Figure 11:
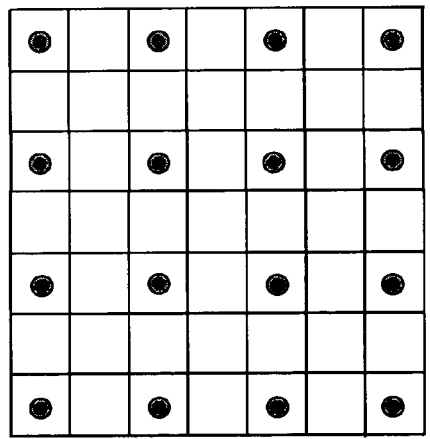
Figure 11:
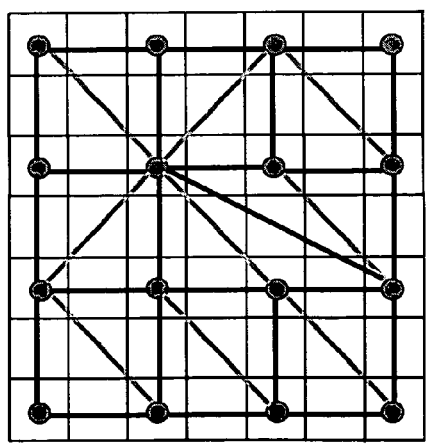

FIG. 9 shows the flow scheme of the whole data dependent triangulation color interpolation according to the method of this invention, including also the optional anti-aliasing processing step following the interpolation step. FIG. 10 illustrates in detail the operations performed in the step Data Dependent Triangulation shown in FIG. 9, while FIG. 11 illustrates by way of an example an embodiment of the method of the invention.

Figure 12:
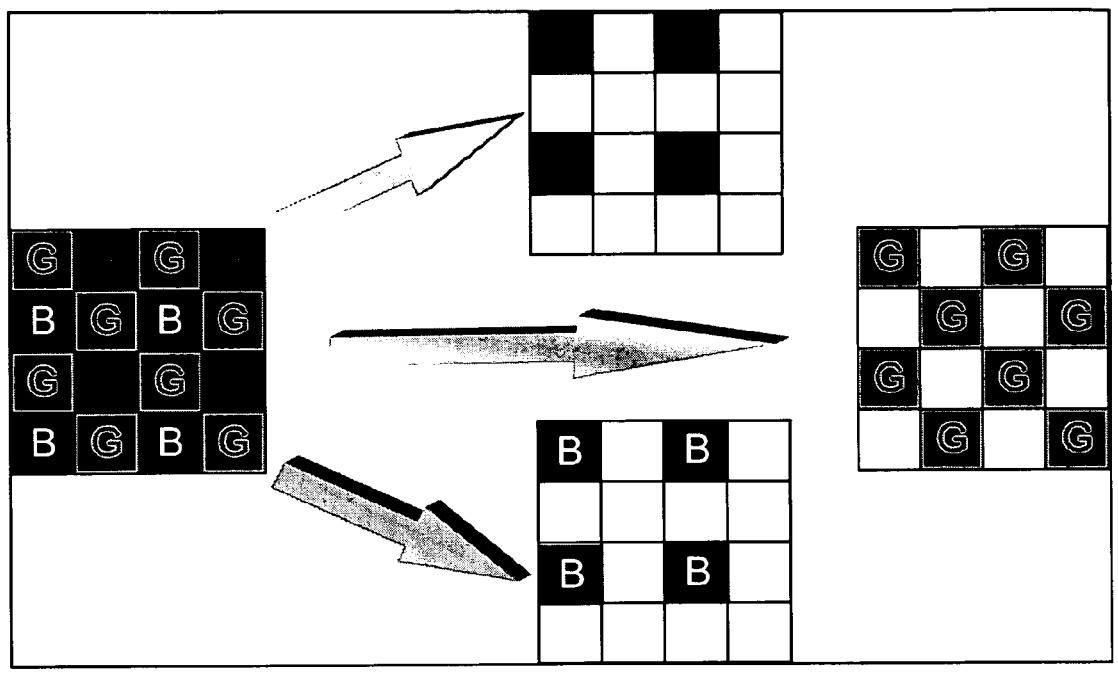
FIG. 12 shows the Bayer Data splitting according to the invention.

By referring to the flow chart of FIG. 9, starting from the Bayer Pattern Data, three channels arrays are constructed, as shown in FIG. 12. The R, G and B pixels in the respective three channels are the vertices of the triangles to be constructed.

Improved Cost Function

The cost function that has been found to be outstandingly efficient in terms of quality vs. computational complexity is the following $$\text{cost}(e) = (|a_1| + |b_1|) * (|a_2| + |b_2|) - \Box P_1 * \Box P_2 \qquad (8)$$

where $$P_i(x,y) = a_i x + b_i y + c_i$$

and $$\Box P_i = (a_i, b_i)$$

is the gradient of the interpolating function $P_i$, which depends on the coordinates x, y of the pixel to be interpolated.

It may be immediately noticed that this function is much simpler to calculate than the Yu-Morse-Sederberg cost function because it uses the calculation of absolute values, additions and multiplications. Using this cost function in the method of color interpolation disclosed in [8], the same quality of images is obtained, while at the same time reducing the computational cost of the interpolation algorithm. Another method in which this cost function may be conveniently used is disclosed hereinafter.

Improved Triangulation

Figure 13:
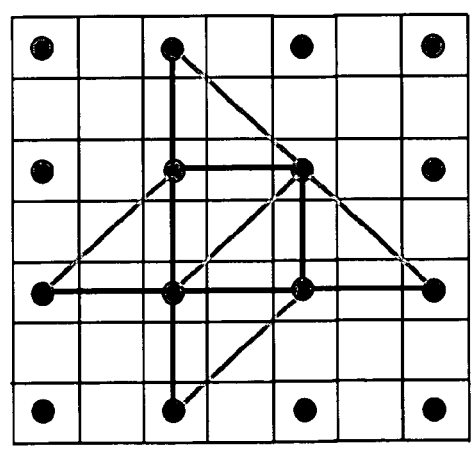
FIG. 13 shows a central square composed of two triangles and its four adjacent triangles obtained according to the invention.

According to another embodiment of the invention, a color interpolation method that uses simple data dependent triangulation has been found. Different from the known method of color interpolation by DDT of Su-Wills [6], the novel method of DDT color interpolation of this invention uses the "edge swap with look-ahead" technique of triangulation. The method of the invention contemplates the following operations:

a) splitting the image in primary colors or complementary colors;

b) subdividing in blocks of 4×4 pixels or also 2×2 pixels an image in primary colors, generating a Delaunay data triangulation using a cost function; and c) each square at the center of the block and its four adjacent triangles are considered, testing whether the at most two possible single edge swappings from the triangulation shown in FIG. 13 of the diagonals, as depicted in FIGS. 14a and 14b, minimize the cost function, and eventually performing these swappings to minimize the local cost.

According to a preferred embodiment, the method of this invention is applied on all three images in primary colors and blocks of 4×4 pixels are considered. Of course, this method may be applied also to two images in primary colors and/or considering blocks of 2×2 pixels.

The process ends when all squares have been processed, and this may be done at most in two iteration steps. This is evident in FIG. 13, but let us consider the case of FIG. 15a, which is possible even if quite rare.

There are four triangles adjacent to the central square that form a quadrilateral with a triangle composing the central square. Only in this case, all the four adjacent triangles should be considered, but at most two swappings are possible. In fact, for each of such adjacent triangles there is another adjacent triangle that form a quadrilateral with the same triangle of the central square.

Therefore, if a diagonal of one of such quadrilaterals is swapped, the diagonal of the other quadrilateral involving the same triangle of the central square cannot be swapped anymore. If this were possible, there would be diagonals crossing each other, which is forbidden in any triangulation technique because each unknown pixel value is calculated by a function of only two known pixels values.

Only in the case of a triangulation as illustrated in FIG. 15a, which rarely occurs, the method of this invention would not produce substantial advantages of reduced computational complexity with respect to the method disclosed in [8].

In case of a triangulation as illustrated in FIG. 15b, which also rarely occurs, there is not any edge swapping possible. Therefore, the method of this invention does not contemplate iteration and is even faster than the prior art method [8].

The cases in which the central square will have only one, two or three adjacent triangles that form a quadrilateral with a triangle that compose it, are more probable than the case of FIG. 15a. On average, according to the method of this invention, the central square will have only two adjacent triangles that form a quadrilateral with a triangle that compose it, while in the algorithm of Yu, Morse and Sederberg, all four adjacent triangles should be considered.

According to a preferred embodiment of this method, the cost function to be used in steps b) and c) is given by eq. (8). Simulations indicate that more than one iteration step may not produce any visual perceptive improvement on the color interpolated image. Therefore, according to a preferred embodiment of this invention, only one iteration step may be performed.

Merging of Channels

The channels R and B are shifted compared to the G channel and then to the original image. For this reason a smart cropping of the borders may be necessary to avoid mixing of colors.

Figure 16:
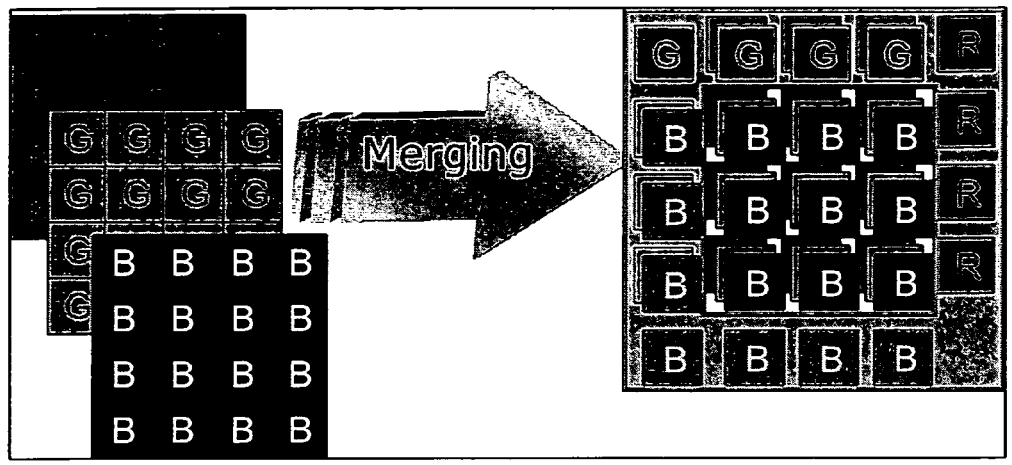
FIG. 16 illustrates how to merge the three channels of an interpolated image according to the invention.

FIG. 16 shows how the merging may be done: only the central pixels are considered, while the peripheral ones are removed. In this implementation four rows and four columns are removed, so the interpolated image will be smaller than that of the original (input) Bayer Pattern.

Anti-Aliasing Algorithm

Figure 17:
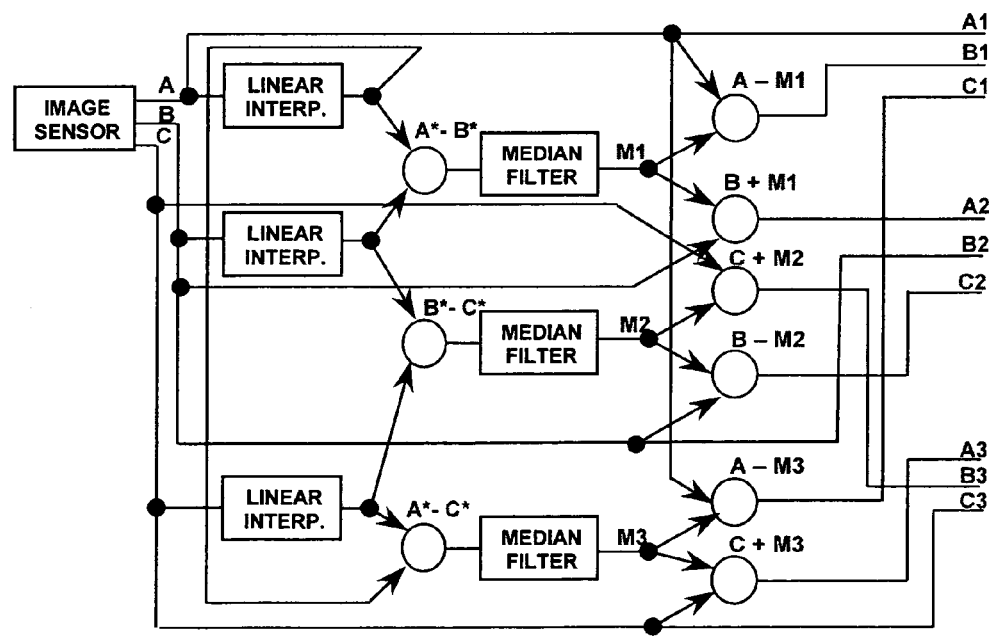
FIG. 17 shows the Freeman's algorithm according to the prior art.

To remove color artifacts, due to the color interpolation step, an anti-aliasing algorithm is necessary. An effective algorithm is the Freeman's algorithm [13], which is summarized in the FIG. 17.

In particular for the RGB channels of a Bayer pattern input image, the Freeman's algorithm uses the following formulas:

for green (G) pixels in the original Bayer Pattern:

$$\hat{G}=G; \hat{R}=G-v_{GR}; \hat{B}=G-v_{GB};$$

for red (R) pixels in the original Bayer Pattern:

$$\hat{R}=R; \hat{G}=R+v_{GR}; \hat{B}=R-v_{RB};$$

for blue (B) pixels in the original Bayer Pattern:

$$\hat{B}=B; \hat{G}=B+v_{GB}; \hat{R}=B+v_{RB};$$

wherein ($\hat{R}$, $\hat{B}$, $\hat{G}$) are the output RGB pixels and $v_{xy}$ is the median filter (the selection window of which is usually a 3×3 or 5×5 window centered on the pixel to be filtered) applied on the image difference (X−Y). Freeman's approach works fairly well to remove color artifacts, but it is slow due to the median filter elaboration of the three difference arrays.

According to an effective approach, only the two difference arrays (G−B) and (G−R) may be used, and only the two median arrays $v_{GB}$ and $v_{GR}$ are calculated. The difference array (R−B) and the related median array $v_{RB}$ is not calculated, thus elaboration time is drastically reduced.

In detail, the color artifact removal after the color interpolation is performed through the steps of:

for each pixel to be filtered, selecting a block of pixels from each component color image with a selection window of pre-established dimensions centered on the pixel to be filtered;

calculating a first median difference between the values of the selected green pixels and the selected red pixels $v_{GR}$ and a second median difference between the values of the selected green pixels and the selected blue pixels $v_{GB}$; and if the pixel to be filtered corresponds to:

a green pixel in the detected image, keeping its original green component and choosing as the value of a new red component thereof $\hat{R}$ the difference between the green value and the first median difference $v_{GR}$ and as the value of a new blue component thereof $\hat{B}$ the difference between the green value and the second median difference $v_{GB}$, a red pixel in the detected image, keeping its original red component and choosing as the value of a new green component thereof $\hat{G}$ the sum between the red value and the first median difference $v_{GR}$ and as the value of a new blue component thereof $\hat{B}$ the difference between the new green component $\hat{G}$ and the second median difference $v_{GB}$, and a blue pixel in the detected image, keeping its original blue component and choosing as the value of a new green component thereof $\hat{G}$ the sum between the blue value and the second median difference $v_{GB}$ and as the value of a new red component thereof $\hat{R}$ the difference between the new green component $\hat{G}$ and the first median difference $v_{GR}$.

FIG. 18 summarizes this innovative aspect and highlights the difference between the just described algorithm and the Freeman's algorithm. Considering that the G patterns are double the number of R or B patterns, the output of the proposed algorithm is 5/6 equal to the output of Freeman's algorithm. In fact, if the repetitive pattern $$\begin{bmatrix} GR \\ BG \end{bmatrix}$$

with final 4*3=12 RGB samples is considered, it is possible to note that G patterns in the two outputs are equal and that the R or B patterns are ⅔ equal, so 6/12+2/12+2/12=5/6. Simulations revealed that the quality of the final image in the proposed algorithm is practically the same as that obtained with the Freeman's algorithm.

REFERENCES

The following references were cited in foregoing description of the invention and the entire contents of each are hereby incorporated by reference.

[1] J. E. Adams, Jr. "Interactions between Color Plane Interpolation and Other Image Processing Functions in Electronic Photography" *Proc. of SPIE* Vol. 2416, pp. 144-151, 1995
[2] R. Kimmel, "Demosaicing: Image reconstruction from colour CCD samples," *IEEE Trans. Image Processing* Vol. 8, pp. 1221-1228, September 1999
[3] J. E. Adams, Jr. "Design of Practical Colour Filter Array Interpolation Algorithms for Digital Cameras" *Proc. Of SPIE* Vol. 3028, pp. 117-125, 1997
[4] S. C. Pei and I. K. Tam, "Effective colour interpolation in CCD colour filter array using signal correlation" *Proc. IEEE Int. Conf. Image Processing* Vol. 3, 2000, pp. 488-491
[5] N. Dyn, D. Levin, S. Rippa, "Data Dependent Triangulations for Piecewise Linear Interpolation" *IMA Journal of Numerical Analysis*, Vol. 10, pp. 137-154, 1990.
[6] D. Su, P. Willis, "Demosaicing of Colour Images Using Pixel Level Data-Dependent Triangulation", Theory and Practice of Computer Graphics 2003, University of Birmingham (UK), June 2003.
[7] D. Su, P. Willis, "Image Interpolation by Pixel Level Data-Dependent Triangulation", Computer Graphics Forum, October 2002.
[8] X. Yu, B. Morse, T. W. Sederberg, "Image Reconstruction Using Data-Dependent Triangulation", IEEE Transactions on Computer Graphics and Applications, pp. 62-68, May/June 2001.
[9] N. Dyn, D. Levin, S. Rippa, "Long, thin triangles can be good for linear interpolation", SIAM Journal of Numerical Analysis, 1992.
[10] C. L. Lawson, "Software for c1 Surface Interpolations," *Mathematical Software III*, J. R. Rice, ed., Academic Press, New York, July 1977, pp. 161-194.
[11] L. Schumaker, "Computing Optimal Triangulations using Simulated Annealing," *Computer Aided Geometric Design*, vol. 10, nos. 3-4, 1993, pp. 329-345.
[12] B. Choi et al., "Triangulation of Scattered Data in 3DSpace," *Computer Aided Design*, vol. 20, no. 5, 1988, pp. 239-248.
[13] W. T. Freeman "Median filter for reconstructing missing color samples" U.S. Pat. No. 4,724,395 (1988).

That which is claimed is:

1. A method of color interpolation of pixels of an image acquired by a color digital sensor by separately interpolating missing image pixels belonging to each one of a plurality of channels in which the acquired pixels are split in terms of primary colors or complementary colors of the pixels of the acquired image for generating weighted pixel values relative to each one of the primary or complementary colors for each pixel of the image to be output, the method comprising:
interpolating the missing pixels of at least one of the channels by determining a respective triangulation representation with vertices coinciding with the pixels of the channel according to a data dependent triangulation technique using a cost function to be minimized, the cost function being $$\mathrm{cost}(e)=(|a_i|+|b_1|)*(|a_2|+|b_2|)-\nabla P_1*\nabla P_2$$

where $$P_i(x,y)=a_ix+b_iy+c_i$$

and $$\nabla P_i=(a_i,\ b_i)$$

is the gradient of the interpolating function $P_i$, which depends on the coordinates x, y of the pixel to be interpolated.

2. The method according to claim 1, wherein the triangulation representation is obtained by using blocks of 4×4 or 2×2 acquired pixels of the channel according to a Delaunay data dependent triangulation technique.

3. The method according to claim 2, wherein the image comprises a Bayer image and the method further comprises:
for each square at the center of a respective block of pixels defined by two triangles determined with the data dependent technique, identifying the four adjacent triangles that share only an edge with the square;
considering two of any adjacent triangles that respectively form a quadrilateral with one and the other triangle that compose the square; and
for each of the two quadrilaterals, evaluating the cost function for deciding whether to swap its diagonal or not according to an edge swap with look-ahead technique.

4. The method according to claim 1, wherein the splitting of the acquired image pixels is done for three basic colors, red, green and blue; and further comprising removing a color artifact following the color interpolation based on the use of green-blue and green-red difference arrays and calculating two median arrays therefrom.

5. A method of color interpolation of pixels of an image acquired by a color digital sensor by separately interpolating missing image pixels belonging to each one of a plurality of channels in which the acquired pixels are split in terms of primary colors or complementary colors of the pixels of the acquired image for generating weighted pixel values relative to each one of the primary or complementary colors for each pixel of the image to be output, the method comprising:
interpolating the missing pixels of at least one of the channels by using blocks of 4×4 or 2×2 acquired pixels and determining a respective triangulation representation with vertices coinciding with the pixels of the channel according to a Delaunay data dependent triangulation technique using a cost function;
for each square at the center of a respective block of pixels defining two triangles determined with the data dependent technique, identifying the four adjacent triangles that share only an edge with the square;
considering two of any adjacent triangles that respectively form a quadrilateral with one and the other triangle that compose the square; and for each of the two quadrilaterals, evaluating the cost function for deciding whether to swap its diagonal or not according to an edge swap with look-ahead technique.

6. The method according to claim 5, wherein the cost function is:

$$\text{cost}(e) = (|a_1|+|b_1|)*(|a_2|+|b_2|) - \nabla P_1 * \nabla P_2$$

where $$P_i(x,y) = a_i x + b_i y + c_i$$

and $$\nabla P_i = (a_i, b_i)$$

is the gradient of the interpolating function $P_i$, which depends on the coordinates x, y of the pixel to be interpolated.

7. The method according to claim 5, wherein the splitting of the acquired image pixels is done for three basic colors, red, green and blue; and further comprising removing a color artifact following the color interpolation based on the use of green-blue and green-red difference arrays and calculation of two median arrays therefrom.

8. The method according to claim 7, wherein the color artifact removal comprises:
for each pixel to be filtered, selecting a block of pixels from each component color image with a selection window centered on the pixel to be filtered;
calculating a first median difference between the values of the selected green pixels and the selected red pixels and a second median difference between the values of the selected green pixels and the selected blue pixels;
if the pixel to be filtered corresponds to:
a green pixel in the detected image, keeping its original green component and choosing as a value of a new red component thereof the difference between the green value and the first median difference and as a value of a new blue component thereof the difference between the green value and the second median difference,
a red pixel in the detected image, keeping its original red component and choosing as a value of a new green component thereof the sum between the red value and the first median difference and as a value of a new blue component thereof the difference between the new green component and the second median difference, and
a blue pixel in the detected image, keeping its original blue component and choosing as a value of a new green component thereof the sum between the blue value and the second median difference and as a value of a new red component thereof the difference between the new green component and the first median difference.

9. A method of color interpolation of pixels of an image acquired by a color digital sensor by separately interpolating missing image pixels belonging to each one of a plurality of channels in which the acquired pixels are split in terms of primary colors or complementary colors of the pixels of the acquired image for generating weighted pixel values relative to each one of the primary or complementary colors for each pixel of the image to be output, the splitting of the acquired image pixels being done for three basic colors, red, green and blue, and in which color artifact removal follows the color interpolation the method comprising:
for each pixel to be filtered, selecting a block of pixels from each component color image with a selection window centered on the pixel to be filtered;
calculating a first median difference between the values of the selected green pixels and the selected red pixels and a second median difference between the values of the selected green pixels and the selected blue pixels;
if the pixel to be filtered corresponds to:
a green pixel in the detected image, keeping its original green component and choosing as a value of a new red component thereof the difference between the green value and the first median difference and as a value of a new blue component thereof the difference between the green value and the second median difference,
a red pixel in the detected image, keeping its original red component and choosing as a value of a new green component thereof the sum between the red value and the first median difference and as a value of a new blue component thereof the difference between the new green component and the second median difference,
a blue pixel in the detected image, keeping its original blue component and choosing as a value of a new green component thereof the sum between the blue value and the second median difference and as a value of a new red component thereof the difference between the new green component and the first median difference.

10. A computer readable storage medium containing computer readable code for programming a computer to perform a method for color interpolation of pixels of an image acquired by a color digital sensor by separately interpolating missing image pixels belonging to each one of a plurality of channels in which the acquired pixels are split in terms of primary colors or complementary colors of the pixels of the acquired image for generating weighted pixel values relative to each one of the primary or complementary colors for each pixel of the image to be output, the computer readable storage medium comprising:
interpolating the missing pixels of at least one of the channels by determining a respective triangulation representation with vertices coinciding with the pixels of the channel according to a data dependent triangulation technique (DTT) using a cost function in which $$\text{cost}(e) = (|a_1|+|b_1|)*(|a_2|+|b_2|) - \nabla P_1 * \nabla P_2$$

where $$P_i(x,y) = a_i x + b_i y + c_i$$

and $$\nabla P_i = (a_i, b_i)$$

is the gradient of the interpolating function $P_i$, which depends on the coordinates x, y of the pixel to be interpolated.

11. The computer readable storage medium according to claim 10, wherein the triangulation representation is obtained by using blocks of 4×4 or 2×2 acquired pixels of the channel according to a Delaunay data dependent triangulation technique.

12. The computer readable storage medium according to claim 11, wherein the image comprises a Bayer image and the method further comprises:
for each square at the center of a respective block of pixels defined by two triangles determined with the data dependent technique, identifying the four adjacent triangles that share only an edge with the square;
considering two of any adjacent triangles that respectively form a quadrilateral with one and the other triangle that compose the square; and for each of the two quadrilaterals, evaluating the cost function for deciding whether to swap its diagonal or not according to an edge swap with look-ahead technique.

13. The computer readable storage medium according to claim 10, wherein the splitting of the acquired image pixels is done for three basic colors, red, green and blue; and further comprising removing a color artifact following the color interpolation based on the use of green-blue and green-red difference arrays and calculating two median arrays therefrom.

14. A computer readable storage medium containing computer readable code for programming a computer to perform a method for color interpolation of pixels of an image acquired by a color digital sensor by separately interpolating missing image pixels belonging to each one of a plurality of channels in which the acquired pixels are split in terms of primary colors or complementary colors of the pixels of the acquired image for generating weighted pixel values relative to each one of the primary or complementary colors for each pixel of the image to be output, the computer readable storage medium comprising:
  interpolating the missing pixels of at least one of the channels by using blocks of 4×4 or 2×2 acquired pixels and determining a respective triangulation representation with vertices coinciding with the pixels of the channel according to a Delaunay data dependent triangulation technique using a cost function;
  for each square at the center of a respective block of pixels defining two triangles determined with the data dependent technique, identifying the four adjacent triangles that share only an edge with the square;
  considering two of any adjacent triangles that respectively form a quadrilateral with one and the other triangle that compose the square; and
  for each of the two quadrilaterals, evaluating the cost function for deciding whether to swap its diagonal or not according to an edge swap with look-ahead technique.

15. The computer readable storage medium according to claim 14, wherein the cost function is:

$$\text{cost}(e) = (|a_1| + |b_1|) * (|a_2| + |b_2|) - \nabla P_1 * \nabla P_2$$

where $$P_i(x,y) = a_i x + b_i y + c_i$$

and $$\nabla P_i = (a_i, b_i)$$

is the gradient of the interpolating function $P_i$, which depends on the coordinates x, y of the pixel to be interpolated.

16. The computer readable storage medium according to claim 14, wherein the splitting of the acquired image pixels is done for three basic colors, red, green and blue; and further comprising removing a color artifact following the color interpolation based on the use of green-blue and green-red difference arrays and calculation of two median arrays therefrom.

17. The computer readable storage medium according to claim 16, wherein the color artifact removal comprises:
  for each pixel to be filtered, selecting a block of pixels from each component color image with a selection window centered on the pixel to be filtered;
  calculating a first median difference between the values of the selected green pixels and the selected red pixels and a second median difference between the values of the selected green pixels and the selected blue pixels;
  if the pixel to be filtered corresponds to:
    a green pixel in the detected image, keeping its original green component and choosing as a value of a new red component thereof the difference between the green value and the first median difference and as a value of a new blue component thereof the difference between the green value and the second median difference,
    a red pixel in the detected image, keeping its original red component and choosing as a value of a new green component thereof the sum between the red value and the first median difference and as a value of a new blue component thereof the difference between the new green component and the second median difference, and
    a blue pixel in the detected image, keeping its original blue component and choosing as a value of a new green component thereof the sum between the blue value and the second median difference and as a value of a new red component thereof the difference between the new green component and the first median difference.

18. A computer readable storage medium containing computer readable code for programming a computer to perform a method for color interpolation of pixels of an image acquired by a color digital sensor by separately interpolating missing image pixels belonging to each one of a plurality of channels in which the acquired pixels are split in terms of primary colors or complementary colors of the pixels of the acquired image for generating weighted pixel values relative to each one of the primary or complementary colors for each pixel of the image to be output, the splitting of the acquired image pixels being done for three basic colors, red, green and blue, and in which color artifact removal follows the color interpolation, the computer readable storage medium comprising:
  for each pixel to be filtered, selecting a block of pixels from each component color image with a selection window centered on the pixel to be filtered;
  calculating a first median difference between the values of the selected green pixels and the selected red pixels and a second median difference between the values of the selected green pixels and the selected blue pixels;
  if the pixel to be filtered corresponds to:
    a green pixel in the detected image, keeping its original green component and choosing as a value of a new red component thereof the difference between the green value and the first median difference and as a value of a new blue component thereof the difference between the green value and the second median difference,
    a red pixel in the detected image, keeping its original red component and choosing as a value of a new green component thereof the sum between the red value and the first median difference and as a value of a new blue component thereof the difference between the new green component and the second median difference,
    a blue pixel in the detected image, keeping its original blue component and choosing as a value of a new green component thereof the sum between the blue value and the second median difference and as a value of a new red component thereof the difference between the new green component and the first median difference.

* * * * *

UNITED STATES PATENT AND TRADEMARK OFFICE
CERTIFICATE OF CORRECTION

PATENT NO. : 7,305,148 B2 Page 1 of 1
APPLICATION NO. : 11/190571
DATED : December 4, 2007
INVENTOR(S) : Spampinato et al.

It is certified that error appears in the above-identified patent and that said Letters Patent is hereby corrected as shown below:

| | |
|---|---|
| Title Page (73) | Delete: "Argate" <br> Insert: -- Agrate -- |
| Title Page (74) | Delete: "USA K. Jorgenson" <br> Insert: -- Lisa K. Jorgenson; Allen, Dyer, Doppelt, Milbrath & Gilchrist -- |
| Column 2, Line 27 | Delete: "liner" <br> Insert: -- linear -- |
| Column 2, Line 44 | Delete: "follow:" <br> Insert: -- follows: -- |
| Column 10, Line 7 | Delete: "$(|a_i| + |b_I|)$" <br> Insert: -- $(|a_I| + |b_I|)$ -- |
| Column 10, Line 62 | Delete: "and for each of the two quadrilaterals, …" <br> Insert: -- and <br>       for each of the two quadrilaterals, … -- |

Signed and Sealed this

Sixth Day of May, 2008

JON W. DUDAS
*Director of the United States Patent and Trademark Office*